(No Model.)

D. ASBURY & E. N. HUTCHISON.
BRICK KILN.

No. 246,997. Patented Sept. 13, 1881.

Witnesses:

Inventors
David Asbury
E. N. Hutchison

UNITED STATES PATENT OFFICE.

DANIEL ASBURY AND E. NYE HUTCHISON, OF CHARLOTTE, N. C.

BRICK-KILN.

SPECIFICATION forming part of Letters Patent No. 246,997, dated September 13, 1881.

Application filed June 18, 1881. (No model.)

*To all whom it may concern:*

Be it known that we, DANIEL ASBURY and E. NYE HUTCHISON, citizens of the United States of America, residing at Charlotte, in the county of Mecklenburg and State of North Carolina, have invented certain new and useful Improvements in Brick-Kilns; and we do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1:
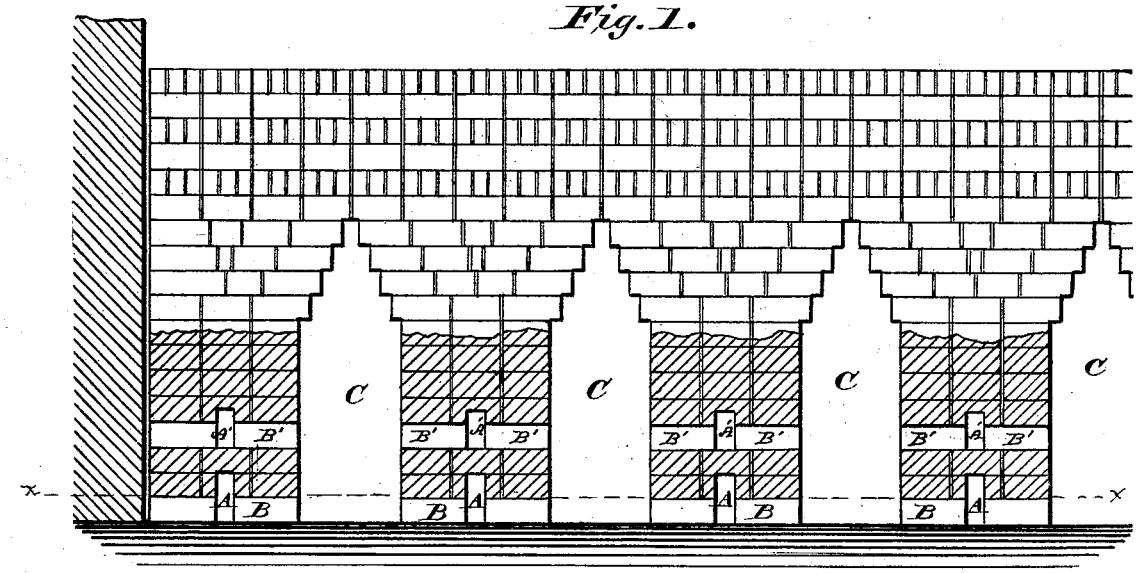
Figure 2:
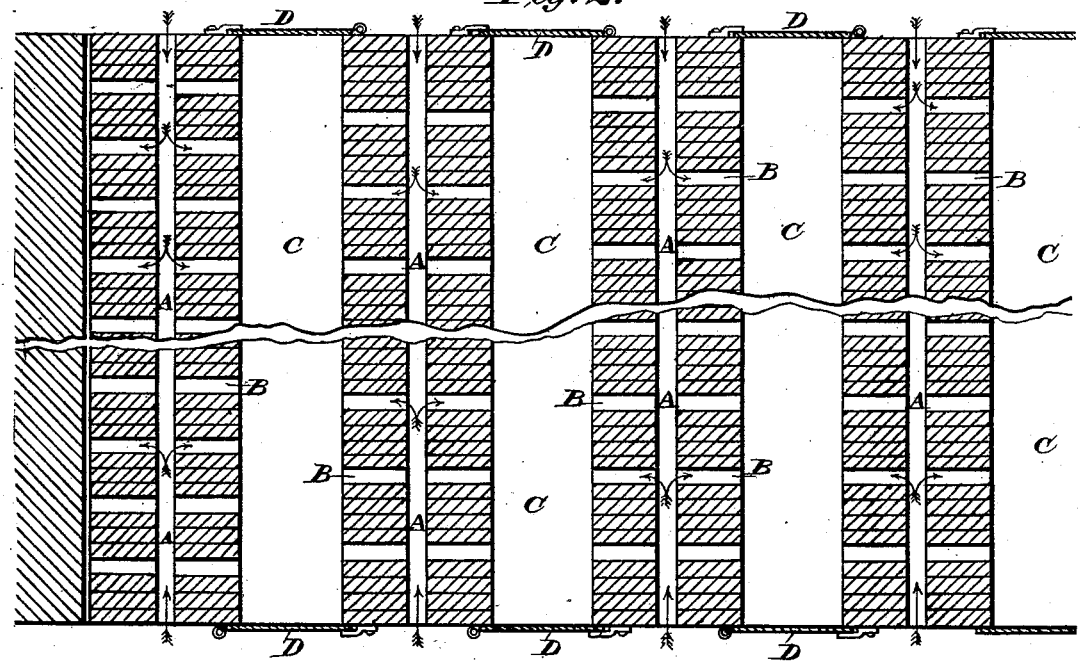

Figure 1 is a view in perspective of our improved kiln. Fig. 2 is a horizontal section of the same on the line $x$ $x$ of Fig. 1.

Our present invention is designed as an improvement on the patent granted to Daniel Asbury, October 7, 1879, No. 220,213.

The object of our invention is to build a brick-kiln which shall be simple in its construction, effective in its operations of burning, and insure a greater saving of time and fuel than has heretofore been done.

Our invention consists in arranging the bricks in the side walls or pillars of the fire-arches so as to leave air spaces or flues leading from the fire-arches into continuous air-flues, the one above the other, which extend the entire width of the kiln through the walls or pillars of the arches, so that the air-drafts from both sides and throughout the entire length of the fire-arches or furnaces may be conducted to the fuel and a more complete and thorough combustion of the fuel insured.

In the construction of kilns heretofore the walls, pillars, or benches of the fire-arches or furnaces have been built up solid and the ends of the arches or furnaces left open, so as to admit the air from the door or end of the furnace over or under or through the fuel. Benches of a permanent character have also been made in brick-kilns of iron, brick, fire-clay, &c., with air spaces or channels entering the furnaces above or below the grates. They have also been made with hollow walls or pillars of the fire-arches, with flues admitting air on a level with the furnace; but said flues have only extended part way through the kiln, and as a consequence the bricks in the center of the kilns are not uniformly or sufficiently burned.

To cheapen and simplify the construction of kilns of this character, and to obviate the defects above named, we build our walls or pillars of the fire-arches of the usual or well-known construction; but instead of making them solid, as has heretofore been done, we leave a small flue or air-space at the bottom running the entire length of said walls or pillars, as shown at A.

In building the sides of the walls or pillars we leave out a brick here and there from the bottom course. We may leave out every other brick, or have two, three, or more bricks laid close together in groups, and then an open space, which connects the furnaces or fire-arches with the flues A, thus forming a series of small flues for the admission of air on a level with the bottom of the furnaces or fire-arches.

So far the description given is essentially the same as in the patent heretofore referred to, and the improvement which we have made thereon we will now proceed to describe.

We have discovered, in burning brick with coal or other ashy fuel, that frequently, before the kiln is burned thoroughly, the ashes collect at the mouths and in the small lateral or air-supplying flues and choke the same, retarding the combustion of the fuel by preventing the free and unobstructed flow of air to the said fuel, so that the fires have to be withdrawn and the arches freed from the ashy deposit, or else a longer period of time is consumed in burning a kiln.

To obviate this defect and to insure a rapid and continuous burning of the kiln, we form in the walls of the fire-arches another flue, A', (a duplicate of flue A,) running parallel with flue A, and providing the same with lateral openings or flues leading into the fire-arches. The flues A' are made tight on the top and bottom by daubing with mud, so that the air will not escape into the kiln, but be drawn into the furnaces to produce a more perfect combustion.

The small or lateral flues are shown at B B', and may be arranged so as to enter or open into the fire-arches or furnaces directly opposite to each other, or they may alternate. We prefer, however, the former arrangement, for the reason that the air-currents meeting in the bottom and center of the fire-arches tends to increase the draft, making the combustion of the fuel more complete, and distributing the calorific currents directly to and around the mass of bricks above.

C are the fire-arches or furnaces, which extend the entire width of the kiln, and are closed at both ends by doors D. Before the fires are started in the fire-arches or furnaces the upper flues, A', are stopped up in any convenient manner, so as to prevent the ingress of air into said flue, and it is only when the small flues B have been stopped up by the accumulation of ashes that the flues A' are opened, and thus the bottoms of the fire-arches or furnaces are transferred to the top of the ash deposit, while the air is allowed to pass freely to the fuel through the flues A' and B'.

Having thus described our invention, what we claim, and desire to secure by Letters Patent, is—

The combination of the continuous fire-arches or furnaces with the small lateral flues or openings and the series of two or more continuous flues or air-passages in each pillar or bench, whereby the fuel in the furnaces is supplied with air at numerous points, both in a horizontal and vertical direction, and a more perfect combustion and distribution of the calorific currents is attained.

In testimony whereof we affix our signatures in presence of two witnesses.

DANIEL ASBURY.
E. NYE HUTCHISON.

Witnesses:
J. C. BURROUGHS,
JOHN R. DAVIDSON.